(12) United States Patent
Botargues et al.

(10) Patent No.: US 8,725,322 B2
(45) Date of Patent: May 13, 2014

(54) METHOD AND DEVICE FOR UPDATING A TARGET ALTITUDE FOR AN EMERGENCY DESCENT OF AN AIRCRAFT

(75) Inventors: Paule Botargues, Toulousse (FR); Erwin Grandperret, Blagnac (FR); Lucas Burel, Blagnac (FR); Thierry Bourret, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 342 days.

(21) Appl. No.: 13/184,174

(22) Filed: Jul. 15, 2011

(65) Prior Publication Data
US 2012/0022725 A1    Jan. 26, 2012

(30) Foreign Application Priority Data
Jul. 20, 2010 (FR) ..................................... 10 55894

(51) Int. Cl.
G05D 1/10      (2006.01)
G05D 1/00      (2006.01)
G06F 19/00     (2011.01)
G01C 21/00     (2006.01)

(52) U.S. Cl.
USPC .................... 701/10; 701/4; 701/16; 701/214

(58) Field of Classification Search
CPC ..... G01C 5/005; G05D 1/0055; G05D 1/042; G06F 19/00
USPC ......... 701/3, 4, 11, 14, 16, 120, 408, 10, 214; 342/15, 174, 120, 357.62; 340/978; 73/1.78
See application file for complete search history.

(56) References Cited

U.S. PATENT DOCUMENTS

| 4,314,341 | A  | * | 2/1982 | Kivela .......................... 701/16 |
| 5,402,116 | A  | * | 3/1995 | Ashley ...................... 340/870.1 |
| 6,216,064 | B1 | * | 4/2001 | Johnson et al. .................. 701/4 |
| 6,263,263 | B1 | * | 7/2001 | Shehi et al. ...................... 701/3 |
| 6,507,776 | B1 | * | 1/2003 | Fox, III .......................... 701/11 |

(Continued)

FOREIGN PATENT DOCUMENTS

| EP | 1459979       | 9/2004 |              |
| EP | 2072949 A2 *  | 6/2009 | ............. G01C 21/28 |

(Continued)

OTHER PUBLICATIONS

French Patent Office, International Search Report FR 1055894 (2 pgs.), Feb. 17, 2011.

*Primary Examiner* — Fadey Jabr
*Assistant Examiner* — Luis A Martinez Borrero
(74) *Attorney, Agent, or Firm* — Wood, Herron & Evans, LLP

(57) ABSTRACT

A method and device are provided for determining a target altitude for an emergency descent of an aircraft that is to be reached by the end of the emergency descent. The device determines an updated target altitude which takes into account variations of barometric pressure and which is able to replace the target altitude that must be reached at the end of the emergency descent. The method includes determining an initial target altitude representative of the initial position of the aircraft and then repeatedly determining a current target altitude along a reference horizontal distance. The current target altitude is compared to the initial target altitude and is used to update the emergency descent if the current target altitude is lower than the initial target altitude.

11 Claims, 2 Drawing Sheets

(56) References Cited

U.S. PATENT DOCUMENTS

| | | | |
|---|---|---|---|
| 6,584,384 B2* | 6/2003 | Gremmert et al. | 701/4 |
| 6,626,024 B1* | 9/2003 | Hedrick | 73/1.78 |
| 6,735,542 B1* | 5/2004 | Burgett et al. | 702/85 |
| 6,768,449 B1* | 7/2004 | Burgett et al. | 342/357.62 |
| 7,095,364 B1* | 8/2006 | Rawdon et al. | 342/120 |
| 7,302,316 B2* | 11/2007 | Beard et al. | 701/11 |
| 7,429,948 B2* | 9/2008 | Burgett et al. | 342/174 |
| 7,792,615 B2* | 9/2010 | Aimar | 701/11 |
| 8,078,345 B2* | 12/2011 | Botargues et al. | 701/16 |
| 8,332,137 B2* | 12/2012 | Venkatraman et al. | 701/408 |
| 2001/0047230 A1* | 11/2001 | Gremmert et al. | 701/4 |
| 2002/0126041 A1 | 9/2002 | Hedrick | |
| 2004/0186635 A1 | 9/2004 | Manfred | |
| 2005/0159857 A1* | 7/2005 | Parlini | 701/4 |
| 2006/0212182 A1* | 9/2006 | Shaw | 701/12 |
| 2007/0043482 A1* | 2/2007 | Aimar | 701/4 |
| 2007/0088492 A1* | 4/2007 | Bitar et al. | 701/120 |
| 2008/0198041 A1* | 8/2008 | Sallier et al. | 340/978 |
| 2008/0243316 A1 | 10/2008 | Sacle et al. | |
| 2009/0143983 A1* | 6/2009 | Venkatraman et al. | 701/214 |
| 2009/0228161 A1 | 9/2009 | Botargues et al. | |
| 2010/0286900 A1* | 11/2010 | Depape et al. | 701/120 |
| 2011/0166722 A1* | 7/2011 | Lee | 701/4 |
| 2011/0210885 A1* | 9/2011 | Lodwig et al. | 342/25 F |

FOREIGN PATENT DOCUMENTS

| | | |
|---|---|---|
| FR | 2892503 | 4/2007 |
| FR | 2939883 | 6/2010 |
| FR | 2939945 | 6/2010 |

* cited by examiner

METHOD AND DEVICE FOR UPDATING A TARGET ALTITUDE FOR AN EMERGENCY DESCENT OF AN AIRCRAFT

TECHNICAL FIELD

The present invention relates to a method and a device for updating a target altitude intended for an emergency descent of an aircraft, in particular a transport airplane.

BACKGROUND

As known, civil transport airplanes should be pressurized, as upon a cruise flight, an airplane flies at an altitude being often higher than 30,000 feet (about 9,000 meters), for which the external air is too low in oxygen (and also too cold and too dry) for being compatible with life. Thus, pressurizing systems are provided in airplanes for keeping on board a breathable atmosphere. In particular, the international aeronautic regulation states that any public transport airplane flying at an altitude higher than 20,000 feet (about 6,000 meters) should be pressurized and that it should establish in the cabin an equivalent altitude which does not exceed 8,000 feet (about 2,400 meters) upon a normal flight.

It may however occur that, as a result of a breakdown or a failure, the pressurization of the airplane could no longer be maintained at an acceptable level. A regulatory procedure then compels the pilot to have the airplane descent, as quickly as possible, at a breathable altitude of 10,000 feet (about 3,000 meters) or at the current security altitude if it is not possible to descent as low as 10,000 feet because of the relief. Such a procedure is referred to as an emergency descent.

In such a case, the crew is responsible for different tasks related to initiating the descent, as well as the adjustment of parameters of the descent (speed, target altitude, lateral trajectory, etc.) and this until the airplane flies level at low altitude.

It may happen, however, although very rarely, that the crew is no longer able to apply the above described procedure, for instance in the case of a pressurization breakdown as a result of which the crew has lost consciousness.

The airplane is, in such a case, unattended, while it is absolutely necessary to carry out an emergency descent. If, in such a situation, the autopilot is activated, the flight is continued automatically until the kerosene supplies are totally exhausted.

In order to avoid such a situation, an autopilot system is known, allowing, when it is triggered, to carry out the emergency descent automatically, that is without requiring the help of a pilot. Moreover, triggering such an automatic emergency descent could be carried out either manually by the pilot, or also automatically.

In particular, from document FR-2,928,465, a specific method is known for automatically controlling an emergency descent of an aircraft. According to this method, when an emergency descent automatic function is triggered, the following successive operations are carried out:

a) a set of vertical setpoints is automatically determined comprising:
   a target altitude representing an altitude to be reached by the aircraft at the end of the emergency descent; and
   a target speed representing a speed that the aircraft should respect upon the emergency descent;

b) a set of lateral setpoints is automatically determined, representing a lateral maneuver to be carried out upon the emergency descent; and c) the aircraft is automatically guided so that it simultaneously respects said set of vertical setpoints and said set of lateral setpoints until reaching said target altitude that it subsequently maintains, said automatic guidance being able to be interrupted by an action of the pilot of the aircraft.

Furthermore, this known method provides particular devices that automatically trigger the emergency descent function, taking into account the variation of altitude of the cabin, that is the variation of pressure inside the cabin.

As far as the determination of a target altitude is concerned within the context of an automated emergency descent, the following is known:

from document U.S. Pat. No. 4,314,341, an automated emergency descent to a security altitude, the value thereof being inclusively fixed to 2000 feet (about 3600 m). Such a value corresponds to a physiologically breathable and satisfactory altitude but it could be lower at the highest grounds (Alpes, Himalayas, Andes, Rocky Mountains, etc.). Therefore, it is not satisfactory to ensure a secured end of maneuver, should a crew be unconscious (as a result of possible collision with the ground);

from document U.S. Pat. No. 6,507,776 B1, a coupling between an autopilot and a GPS system having a data base wherein values of altitude are stored for all reliefs, having the altitude higher than or equal to a fixed maximum value. Such a GPS system is provided with a device for identifying the relief along the current trajectory. Such a device allows the autopilot to be provided with the lowest possible security target altitude, being available adjusting the heading of the aircraft if needed, for bypassing the ground. Such a device has the drawback of potentially directing the aircraft outside the area covered by the initially followed air traffic way. The associated risk involves increasing the workload of the crew when they regain conciousness, as the aircraft is likely to fly far from the initially followed flight itinerary, and, moreover, may not have enough kerosene available for reaching the closest deviating airport. Additionally, such a margin of only 1,000 feet with respect to the ground, may not be satisfactory for covering all the possible fluctuations of barometric pressure along the emergency descent; and from document U.S. 2007/0043482, another device integrated into an autopilot able to carry out automatically an emergency descent to a security altitude, the calculation thereof being based on security minimum altitudes of the Minimum Safe Altitude ("MSA") type. More precisely, a data base containing the MSA altitudes is used for determining the associated security altitude, either at the current flight itinerary, or, should it exist, at a deviation trajectory provided by the airline company. When the airplane is outside the flight itinerary or outside a deviation way, the security altitude is calculated from the data base of the ground, taking as a value, the maximum altitude on a trajectory maintaining the current heading, to which there is added a security margin of 1,000 feet or 2,000 feet (in the case of a hilly area). However, this security margin with respect to the ground could decrease significantly if no update of the target altitude has been carried out for taking into account the barometric pressure reference.

As known, the local atmospheric pressure is subject to non negligible variations on a distance such as the distance covered upon an emergency descent, for instance approximately 40 NM.

Moreover, the values of the security altitudes MSA or Minimum Off Route Altitude ("MORA") issued from known data bases available by the Flight Management System ("FMS") are barometric altitude values, referenced with respect to the level of the Mean Sea Level ("MSL").

Moreover, upon a cruise flight, the barometric reference of the on-board instruments is generally a standard reference (STD), corresponding to a nominal pressure of 1013.25 hPa. This reference is used by all the airplanes in a cruise phase as well as by the air traffic control, and allows for some consistency between the exchanged altitude information. Flight levels are taken into account. When an airplane flies at a flight level FL350 for instance, this means it is flying at an altitude of 35,000 feet, referenced at 1013.25 hPa/15° C. (standard ISA model). As the local atmospheric pressure constantly progresses when the airplane crosses different masses of air, the airplane actually changes elevation with respect to the sea level following the same flight level. As the reference remains the same for all the air traffic, this does involve any problem for the air control, for knowing precisely the relative altitudes of each of the airplanes and ensuring a satisfactory security level.

Taking into account all those constraints, it is understood that if the barometric reference of the airplane is the standard reference STD and the MSL referenced security altitude is known, it is necessary to determine the local QNH pressure (e.g., "QNH" is the Q-code defined as "barometric pressure adjusted to sea level") of the flown over point, i.e. the pressure converted to the level of the sea, for precisely updating the target altitude on the local reference while keeping the barometric control of the on-board instruments based on the standard reference (STD). This last point is important, as it is desired not to modify the barometric settings of the cockpit for two main reasons:

keeping a consistency with the usually used barometric reference in a cruise, by all the traffic and by the air traffic control; and allowing the pilot to quickly find his marks in the case where he would have lost conciousness and subsequently regain conciousness as a result of a depressurization at the origin of the automatic emergency descent.

It is known that the pressure QNH is provided by ground stations being located in the vicinity of airports, but there is no simple means allowing the local QNH pressure to be obtained automatically.

Thus, in the absence of an update of the target altitude for taking into account the differences of pressure reference, the security margins are likely to be considerably reduced with respect to the ground.

The present invention aims at solving the above mentioned drawbacks. It relates to a method for updating a target altitude intended for an emergency descent of an aircraft, said target altitude representing the altitude to be reached by the aircraft at the end of the emergency descent.

SUMMARY OF THE INVENTION

To this end, according to this invention, said method is remarkable in that:

a) a target security altitude is determined as a function of the emergency descent;

b) a correction value is determined taking into account variations of barometric pressure occurring upon the emergency descent; and c) the sum of said target security altitude and said correction value is calculated for obtaining an updated target altitude being able to replace a target altitude to be reached before the end of the emergency descent.

Thereby, thanks to this invention, an updated target altitude is determined taking into account variations of barometric pressure occurring upon the emergency descent and being able to replace a target altitude to be reached before the end of the emergency descent.

The method according to this invention thereby allows overcoming a potentially significant decrease of the security margin taken into account in the commonly used data bases.

In a first embodiment, at step b), for determining the correction value:

the lowest atmospheric pressure and the highest atmospheric pressure encountered this day are taken into account;

first and second differences are determined between a barometric reference and, respectively, said lowest atmospheric pressure and said highest atmospheric pressure; and the highest difference is converted in absolute value, between these first and second differences, into a height value representing said correction value.

Moreover, in a second embodiment, at step b), for determining the correction value, the following operations are carried out automatically and repeatedly:

the current barometric altitude of the aircraft is determined;

the current height of the aircraft is determined with respect to the level of the sea, through devices other than barometric measurement devices; and said current height is subtracted from said current barometric altitude so as to obtain said correction value.

Furthermore, in a first alternative embodiment, at step c), the target altitude is replaced by the updated target altitude, repeatedly at each determination of a new updated target altitude, and this preferably until the target altitude is captured.

Moreover, in a second alternative embodiment, at step c), the target altitude is replaced by the updated target altitude, only if the updated target altitude is higher than said target altitude. This second alternative embodiment allows the aircraft to avoid descending under a target security altitude.

Furthermore, in a third alternative embodiment, said updated target altitude and the target altitude being repeatedly calculated by calculation pitches, at step c):

the difference is calculated between the target altitude for a pitch N−1, N being an integer, and the updated target altitude for a pitch N;

the absolute value of this difference is compared with a threshold value; and the target altitude is replaced for a pitch N by the updated target altitude for this pitch N, only if the absolute value of said difference is higher than or equal to said threshold value.

This third alternative embodiment allows for the avoidance of too often refreshing the target altitude in the case where the difference of altitude between two updates is not significant, which could seem inappropriate and even disturb the crew in the case where they remain conscious.

In a preferred embodiment, at step a), for determining a target security altitude as a function of the emergency descent, the following operations are automatically and repeatedly carried out from the activation of the emergency descent, and on a reference horizontal distance ahead of the aircraft with respect to an initial position of said aircraft upon the activation of the emergency descent:

a remaining horizontal distance is determined, representing a horizontal distance remaining to be covered by the aircraft from its current position until a position located at said reference horizontal distance ahead of said initial position;

a security altitude is determined representative of said remaining horizontal distance;

this security altitude is compared to a threshold altitude; and as a target security altitude, the highest value is selected between said security altitude and said threshold altitude.

The above mentioned method according to this invention for updating an optimum target altitude for an emergency descent of an aircraft, is adapted to any type of partially or completely automated emergency descent method.

However, in a preferred application, this method is used for updating a target altitude in a process for automatically controlling an emergency descent of an aircraft, wherein the following successive operations are carried out:

a) a set of vertical setpoints is automatically determined, comprising:

a target altitude representing an altitude to be reached by the aircraft at the end of the emergency descent; and a target speed representing a speed that the aircraft should respect upon the emergency descent;

b) a set of lateral setpoints is automatically determined, representing a lateral maneuver to be carried out upon the emergency descent; and c) the aircraft is automatically guided so that it simultaneously respects said set of vertical setpoints and said set of lateral setpoints until reaching said target altitude.

The present invention further relates to a device for automatically updating a target altitude for an emergency descent of an aircraft, said target altitude representing the altitude to be reached by the aircraft at the end of the emergency descent.

According to this invention, this device comprises:

means for determining a target security altitude as a function of the emergency descent;

means for determining a correction value taking into account variations of barometric pressure occurring upon the emergency descent; and means for calculating the sum of said target security altitude and said correction value for obtaining an updated target altitude being able to replace a target altitude to be reached at the end of the emergency descent.

This device thus allows updating the target altitude upon an automatic emergency descent including overcoming the local pressure QNH.

The present invention further relates to a system for automatically controlling an emergency descent of an aircraft, of the type comprising:

first means for automatically determining a set of vertical setpoints, comprising:

a target altitude representing an altitude to be reached by the aircraft at the end of the emergency descent; and a target speed representing a speed that the aircraft should respect upon the emergency descent;

second means for automatically determining a set of lateral setpoints, representing a lateral maneuver to be carried out upon the emergency descent; and third means for automatically guiding the aircraft so that it simultaneously respects said set of vertical setpoints and said set of lateral setpoints until reaching said target altitude, wherein said first means comprise the above mentioned device for updating said target altitude.

The present invention further relates to an aircraft, in particular a transport airplane, being provided with a device and/or a system such as mentioned hereinabove.

BRIEF DESCRIPTION OF THE DRAWINGS

The FIGS. of the appended drawings will better explain how this invention can be implemented. In these FIGS., like reference numerals relate to like components.

DETAILED DESCRIPTION

Figure 1:
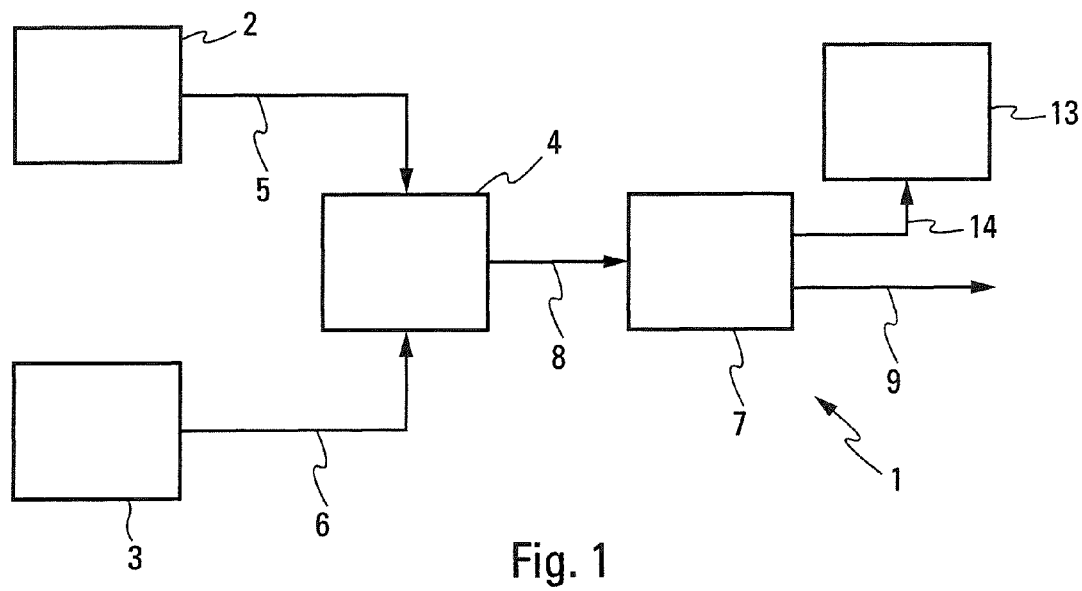
FIG. 1 is a block diagram of a device according to this invention.

The target altitude updating device 1 according to this invention and schematically shown on FIG. 1 is intended for updating, automatically, a target altitude for an emergency descent of an aircraft AC, in particular a transport airplane, said target altitude representing the altitude to be reached by the aircraft AC at the end of the emergency descent.

Said device 1 comprises:

a target security altitude determination device 2 for determining a target security altitude ZS as a function of the emergency descent;

a correction value calculation device 3 being formed so as to determine a correction value ZC taking into account variations of barometric pressure occurring upon the emergency descent; and an updated target altitude calculation device 4 being connected via links 5 and 6 respectively to the target security altitude determination device 2 and the correction value calculation device 3 and being formed so as to calculate the sum of said target security altitude ZS and said correction value ZC for obtaining an updated target altitude ZR being able to replace a target altitude to be reached at the end of the emergency descent.

Thereby, the device 1 according to this invention determines an updated target altitude ZR taking into account variations of barometric pressure occurring upon the emergency descent and being able to replace a target altitude to be reached before the end of the emergency descent.

Said device 1 further comprises a target altitude replacement device 7 being connected via a link 8 to the updated target altitude calculation device 4 and being formed so as to replace the target altitude with the updated target altitude ZR, generally as a function of particular conditions, to be set forth below, this updated target altitude ZR being able to be transmitted via a link 9.

Said device 1 thereby allows for overcoming a potentially significant decrease of the security margin taken into account in the commonly used data bases.

In a first embodiment, the correction value calculation device 3 comprises the following (not shown) elements, for determining the correction value ZC:

a memory that stores the lowest atmospheric pressure Rmin and the highest atmospheric pressure Rmax, recorded on the day when the updated is carried out;

a difference calculation device determining first and second differences between a barometric reference R and, respectively, said lowest atmospheric pressure Rmin and said highest atmospheric pressure Rmax; and a correction conversion device converting the highest difference in absolute value, between these first and second differences, into a height value representing said correction value.

Consequently, in this first embodiment, the correction value ZC meets the following relationship:

$ZC = \max(|R-Rmin|; R-Rmax|) 0.28$ wherein:

R, Rmin and Rmax are expressed in hPa;

ZC is expressed in feet; and 28 is a value for carrying out the conversion, as explained subsequently.

Moreover, in a second embodiment, the correction value calculation device 3 comprises the following (not shown) elements, for determining the correction value:

a barometric altitude sensor determining the current barometric altitude Zbaro of the aircraft AC, for instance a reference system of anemometric and inertial data of the Air Data Inertial Reference System ("ADIRS") type;

a sea level height sensor determining the current height Zgeo of the aircraft AC with respect to the level of the sea MSL, using means other than barometric measurement device, including by means of a global positioning system of the Global Navigation Satellite System ("GNSS") type, for instance of the GPS type; and a difference calculation device subtracting said current height Zgeo from said current barometric altitude Zbaro so as to obtain said correction value ZC.

Consequently, in this second embodiment, the correction value ZC meets the following relationship:

ZC=Zbaro−Zgeo

Furthermore, in a first alternative embodiment, the target altitude replacement device 7 replaces the target altitude AL with the updated target altitude ZR, repeatedly upon each determination of a new updated target altitude ZR, and this preferably until the target altitude is captured.

Moreover, in a second alternative embodiment, the target altitude replacement device 7 replaces the target altitude AL with the updated target altitude ZR, only if the updated target altitude ZR is higher than said target altitude AL. This second alternative embodiment allows the aircraft AC to avoid descending under a target security altitude.

Furthermore, in a third alternative embodiment, the target altitude replacement device 7 comprises the following (not shown) elements:

a difference calculation device calculating the difference between the target altitude AL for a pitch N−1, and the updated target altitude ZR for a pitch N, N being an integer, said updated target altitude ZR and the target altitude AL being calculated repeatedly by calculation pitches;

a threshold comparison device comparing the absolute value of this difference to a predetermined threshold value; and a replacement selector replacing the target altitude for one pitch N with the updated target altitude for this same pitch N, only if said absolute value of the difference is higher than or equal to said threshold value.

This third alternative embodiment will avoid too often refreshing the target altitude in the case where the difference of altitude between two updates is not significant, which could seem inappropriate and even disturb the crew in the case where they remain conscious.

In a preferred embodiment, the target security altitude determination device 2 for determining a target security altitude ZS as a function of the emergency descent, comprises (not shown) elements for, automatically and repeatedly, from the activation of the emergency descent, and on a reference horizontal distance ahead of the aircraft AC with respect to an initial position of said aircraft AC upon the activation of the emergency descent, carrying out the following operations:

determining a remaining horizontal distance, representing a horizontal distance remaining to be covered by the aircraft from its current position until a position located at said reference horizontal distance ahead of said initial position;

determining a security altitude being representative of said remaining horizontal distance;

comparing this security altitude to a threshold altitude; and selecting, as a target security altitude ZS, the highest value between said security altitude and said threshold altitude.

Furthermore, from the activation of the emergency descent:

an initial target altitude is automatically determined being representative of said initial position of the aircraft upon said activation of the emergency descent; and furthermore, the following operations are carried out, automatically and repeatedly, on said reference horizontal distance:

the target security altitude ZS is compared (that has been determined as above described), referred to as the current target altitude, to said initial target altitude; and if said current target altitude is lower than said initial target altitude, the target altitude used upon the emergency descent is updated, taking into account said current target altitude.

An optimized target altitude ZS can thereby be determined on said remaining horizontal distance located ahead the aircraft AC, maximizing the possibility to return to a nominal state in the case where a crew or passengers being unconscious or victims of hypoxia symptoms, without reducing the security margins with respect to the relief along the trajectory to be followed.

Preferably, said reference horizontal distance corresponding to a maximum horizontal distance the aircraft AC is able to cover upon an emergency descent from the highest cruise flight level for the aircraft, to which a margin can be added.

Figure 2:
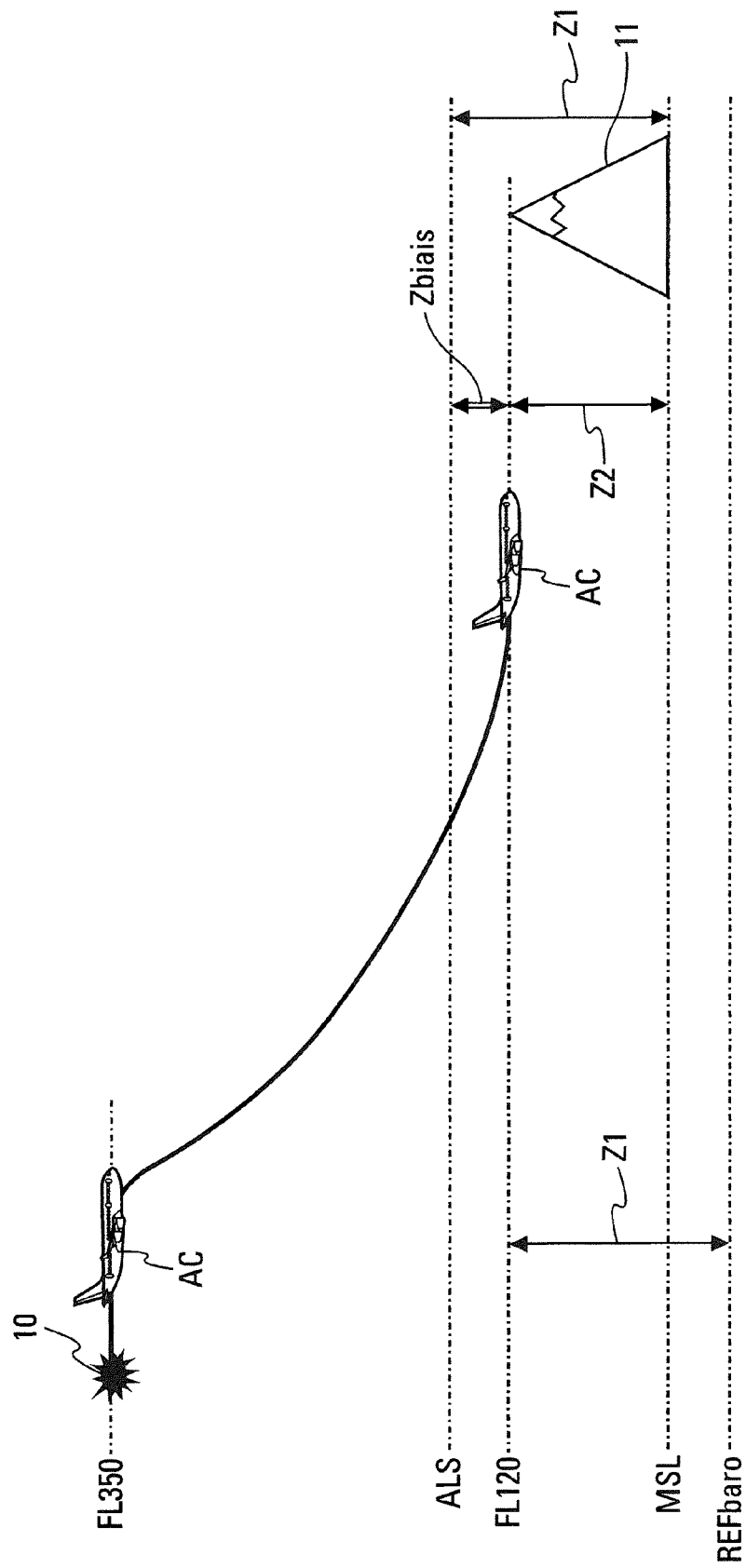
FIG. 2 shows a diagram allowing the update carried out according to the present invention to be explained.

The example on FIG. 2 allows the characteristics of the present invention to be further emphasized. Before the emergency descent, the aircraft AC is in a cruise phase at a level of flight FL350 (that is at 35,000 feet) with a standard barometric reference REFbaro, that is 1013.25 hPa/15° C. (standard ISA temperature), when a failure occurs, illustrated by a symbol 10. The ground data base being provided on the aircraft AC, indicates a maximum security altitude Z1 (of the MORA type) of 12,000 feet on the trajectory of the aircraft AC. If this system for controlling the emergency descent just takes as the target altitude this value of altitude Z1 throughout the whole descent, thus corresponding to the level of flight FL120 (with respect to REFbaro), the local pressure (977 hPa in the example) introduces a bias Zbias (of about 1,000 feet, to be set forth below) with respect to the altitude ALS (above the relief 11) to be reached. The aircraft AC will then be at an altitude Z2 of 11,000 feet with respect to the level of the sea MSL, and not at an altitude Z1 of 12,000 feet (with respect to the level of the sea MSL).

As far as the bias Zbias is concerned, if, in a first approximation, that an atmospheric pressure differential of one hectopascal corresponds to an altitude differential of about 28 feet, the following is obtained:

Zbias=ΔP·28 with ΔP=1013.25−977=36.25 hPa, hence:

Zbias=1,008 feet.

This example shows that, without an update of the target altitude for taking into account the differences of pressure reference, the security margins are likely to be considerably reduced with respect to the ground.

The device 1 further comprises an indication display 13, being connected to the target altitude replacement device 7 via a link 14. Such an indication display 13 allows, more specifically, to present to the pilots of the aircraft AC, the updated target altitude, calculated by the device 1 and to check the relevance thereof with respect to security altitude values indicated on the navigation maps or on the navigation screens of the aircraft AC.

The above mentioned device 1 according to this invention, for updating a target altitude for an emergency descent of an aircraft AC, is adapted to any type of partially or completely automated emergency descent system.

However, in a preferred application, such a device 1 is used to update the target altitude in an automatic control system 15 for automatically controlling an emergency descent of an aircraft AC such as by communication via link 9.

Figure 3:
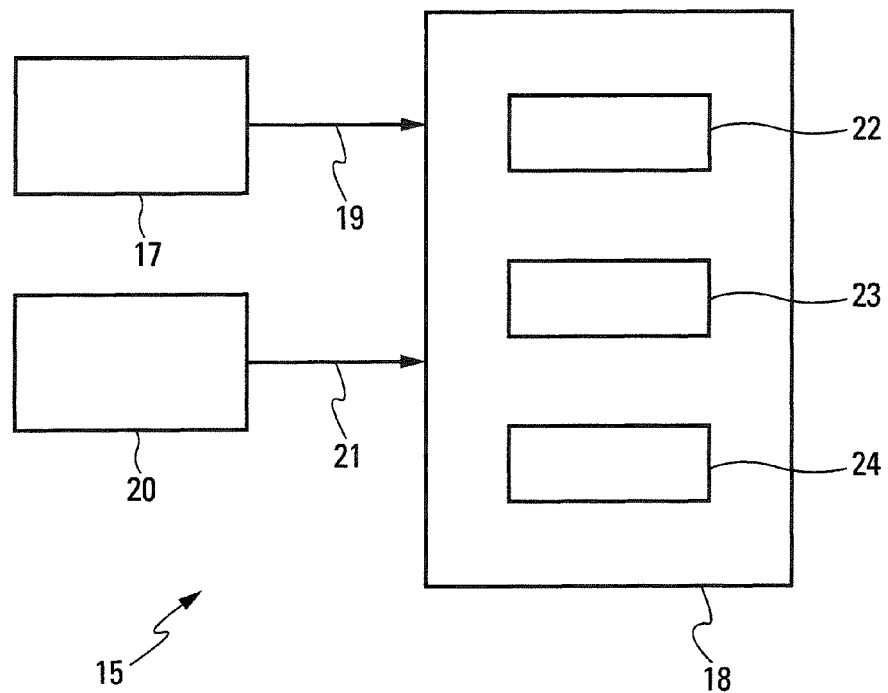
FIG. 3 is a block diagram of a system for automatically controlling an emergency descent of an aircraft, comprising a device according to this invention.

Preferably, such a system 15 for automatically controlling an emergency descent is of the type comprising, such as shown on FIG. 3:

a triggering device 17 being able to trigger an automatic function of emergency descent;

a controller 18 being connected via a link 19 to said triggering device 17 and being formed so as to implement an automatic function of emergency descent, when it is triggered by the triggering device 17, automatically carrying out a longitudinal guidance, a lateral guidance and a control of the speed of the aircraft AC; and a disengaging device means 20 being connected via a link 21 to said controlling means the controller 18 and allowing to control a disengagement of an automatic function of emergency descent being carried out.

Such a function of automatic emergency descent thereby allows to bring the aircraft AC back to a breathable altitude (target altitude) and in a stabilized situation, with a view, more specifically, to reanimate (if necessary) the crew and the passengers and to continue the flight.

The controller 18 comprises:

a vertical setpoint determination device 22 for automatically determining a set of vertical setpoints, more specifically, comprising:

The target altitude representing the altitude to be reached by the aircraft AC on the end of the emergency descent;

a target speed representing the speed that the aircraft AC should respect upon the emergency descent;

a lateral setpoint determination device 23 for automatically determining a set of lateral setpoints. Such a set represents a lateral maneuver to be carried out upon the emergency descent; and an aircraft guidance system 24 for automatically guiding the aircraft, upon triggering an automatic function of emergency descent, so that it simultaneously respects said set of vertical setpoints and said set of lateral setpoints, and this, until reaching said target altitude that it subsequently maintains, as soon as it has reached it.

Such a system 15 for automatically controlling an emergency descent could, more specifically, be similar to the system described in document FR-2,928,465 of the Applicant.

In such a case, the vertical setpoint determination device 22 comprises the device 1 for updating the target altitude.

This system 15 could additionally have more specifically the following characteristics:

two arming types could be contemplated: a voluntary arming and an automatic arming.

When the crew decides to carry out an emergency descent as a result of a depressurization, a fire alarm or any other reason, they have the possibility to arm the function actuating a dedicated press-button. A logic allows such an arming condition to be validated as a function, more specifically, of the current altitude of the aircraft AC.

The automatic arming is linked to a depressurization event. It occurs when some criteria involving the pressure of the air or the variation of the pressure of the air inside the cabin are met.

The arming of the function always precedes triggering thereof;

the crew keeps at all time the possibility to manually disarm the function, whatever the type of (voluntary or automatic) arming;

two types of triggering are possible as a function of the arming that has preceded.

Subsequently to a voluntary arming, the triggering only occurs once the air brakes are completely implemented by the crew.

On the other hand, if the arming has been automatic, the triggering also occurs automatically at the end of a count-down initiated upon the arming, if the crew has not reacted before the end thereof. However, if, following a procedure, the crew completely implements the air brakes before the end of the count-down, triggering the function is anticipated with respect to the automatic triggering;

when the function of automatic emergency descent is triggered, the guidance and the control of the speed of the aircraft occur in the vertical and the lateral planes as follows:

in the vertical plane, the speed adopted to carry out the automatic emergency descent is selected by default by the automatism so as to minimize the descent time. The crew could freely adjust such a speed upon the maneuver of descent, in order to take into account possible structure damages, and this, without disengaging the function;

the lateral maneuver carried out simultaneously with the longitudinal maneuver aims at to deviate the aircraft AC from the current way so as to avoid meeting other aircrafts flying on the same way, but a lower altitudes;

getting out of the automatic emergency descent coincides with the capture, then the maintain of the targeted altitude upon the maneuver; and upon the automated maneuver of emergency descent, the crew can at all time take over on the automatism using usual means: manual action on the joystick, triggering a new mode of guidance of the aircraft AC, disconnection button, adjustment of the speed or of the heading, etc.

The invention claimed is:

1. A method for updating a target altitude for an emergency descent of an aircraft with a target updating device on board the aircraft, the target altitude representing the altitude to be reached by the aircraft at the end of the emergency descent, the method comprising:

(a) determining, with a target security altitude determination device included in the target updating device, a target security altitude as a function of the emergency descent, by automatically and repeatedly carrying out the following operations, from an activation of the emergency descent, and relative to a reference horizontal distance ahead of the aircraft with respect to an initial position of the aircraft at the activation of the emergency descent:

calculating a remaining horizontal distance representing a horizontal distance remaining to be covered by the aircraft from a current position until a position located at the reference horizontal distance;

determining a security altitude corresponding to the remaining horizontal distance;

comparing the security altitude to a threshold altitude; and selecting, as the target security altitude, a highest value between the security altitude and the threshold altitude, the target security altitude being measured in units of measurement chosen from feet or meters;

(b) calculating, with a correction value calculation device included in the target updating device, a correction value, taking into account variations of barometric pressure occurring during the emergency descent, the correction value being measured in the same units of measurement as the target security altitude and the correction value corresponding to a potential error between an actual current altitude of the aircraft and a measured barometric altitude which is based on a standard reference pressure and is thereby affected by a local QNH pressure of the current position;

(c) arithmetically summing, with an updated target altitude calculation device included in the target updating device, the target security altitude and the correction value to obtain an updated target altitude that replaces the target altitude to be reached before the end of the emergency descent, the updated target altitude being corrected from potential collision risks caused by the potential error between the actual current altitude of the aircraft and the measured barometric altitude; and (d) transmitting the updated target altitude to an automatic control system of the aircraft to automatically conduct the emergency descent using the updated target altitude.

2. The method according to claim 1, wherein step (b) further comprises:

retrieving from a memory a lowest atmospheric pressure and a highest atmospheric pressure measured in a current day;

calculating, with a difference calculation device, first and second differences between the standard reference pressure and, respectively, the lowest atmospheric pressure and the highest atmospheric pressure; and selecting a highest difference calculated by the difference calculation device and converting, with a correction conversion device, the highest difference in absolute value into a height value representing the correction value.

3. The method according to claim 1, wherein step (b) further comprises, automatically and repeatedly:

sensing, with a barometric altitude sensor, a current barometric altitude of the aircraft;

sensing, with a sea level height sensor, a current height of the aircraft with respect to sea level, using measurements other than barometric measurement; and arithmetically subtracting, with a difference calculation device, the current height with respect to sea level from the current barometric altitude so as to obtain the correction value.

4. The method according to claim 1, wherein step (c) further comprises replacing the target altitude with the updated target altitude, repeatedly upon each determination of a new updated target altitude.

5. The method according to claim 1, wherein step (c) further comprises replacing the target altitude with the updated target altitude, only if the updated target altitude is higher than the target altitude.

6. The method according to claim 1, wherein the updated target altitude and the target altitude are repeatedly calculated by calculation pitches, and step (c) further comprises:

calculating a difference between the target altitude for a pitch N−1, N being an integer, and the updated target altitude for a pitch N;

comparing an absolute value of the calculated difference to a threshold value; and replacing the target altitude for a pitch N with the updated target altitude for the pitch N, only if the absolute value of the difference is higher than or equal to the threshold value.

7. A process for automatically controlling an emergency descent of an aircraft with an automatic control system on board the aircraft, the process comprising:

(a) determining, with a target security altitude determination device included in a target updating device, a target security altitude as a function of the emergency descent, by automatically and repeatedly carrying out the following operations, from an activation of the emergency descent, and relative to a reference horizontal distance ahead of the aircraft with respect to an initial position of the aircraft at the activation of the emergency descent:

calculating a remaining horizontal distance representing a horizontal distance remaining to be covered by the aircraft from a current position until a position located at the reference horizontal distance;

determining a security altitude corresponding to the remaining horizontal distance;

comparing the security altitude to a threshold altitude; and selecting, as the target security altitude, a highest value between the security altitude and the threshold altitude, the target security altitude being measured in units of measurement chosen from feet or meters;

(b) calculating, with a correction value calculation device included in the target updating device, a correction value, taking into account variations of barometric pressure occurring during the emergency descent, the correction value being measured in the same units of measurement as the target security altitude and the correction value corresponding to a potential error between an actual current altitude of the aircraft and a measured barometric altitude which is based on a standard reference pressure and is thereby affected by a local QNH pressure of the current position;

(c) arithmetically summing, with an updated target altitude calculation device included in the target updating device, the target security altitude and the correction value to obtain an updated target altitude that replaces the target altitude to be reached before the end of the emergency descent, the updated target altitude being corrected from potential collision risks caused by the potential error between the actual current altitude of the aircraft and the measured barometric altitude;

(d) transmitting the updated target altitude to the automatic control system of the aircraft to automatically conduct the emergency descent using the updated target altitude;

determining automatically, with a vertical setpoint determination device included in the automatic control system, a set of vertical setpoints that includes the updated target altitude representing an altitude to be reached by the aircraft at the end of the emergency descent and a target speed representing a speed that the aircraft should respect during the emergency descent;

determining, with a lateral setpoint determination device included in the automatic control system, a set of lateral setpoints, representing a lateral maneuver to be carried out during the emergency descent; and guiding the aircraft with an aircraft guidance system included in the automatic control system so that the aircraft simultaneously respects the set of vertical setpoints and the set of lateral setpoints until reaching the updated target altitude.

8. A target updating device for updating a target altitude intended for an emergency descent of an aircraft, the target altitude representing the altitude to be reached by the aircraft at the end of the emergency descent, said target updating device comprising:

a target security altitude determination device that automatically and repeatedly determines a target security altitude as a function of the emergency descent, from an activation of the emergency descent, and relative to a reference horizontal distance ahead of the aircraft with respect to an initial position of said aircraft at the activation of the emergency descent, said target altitude determination device further comprising:
- a first element that calculates a remaining horizontal distance, representing a horizontal distance remaining to be covered by the aircraft from a current position until a position located at the reference horizontal distance;
- a second element that determines a security altitude corresponding to the remaining horizontal distance;
- a third element that compares the security altitude to a threshold altitude; and
- a fourth element that selects, as a target security altitude, a highest value between the security altitude and the threshold altitude, the target security altitude being measured in units of measurement chosen from feet or meters;

a correction value calculation device that calculates a correction value taking into account variations of barometric pressure occurring during the emergency descent, the correction value being measured in the same units of measurement as the target security altitude and the correction value corresponding to a potential error between an actual current altitude of the aircraft and a measured barometric altitude which is based on a standard reference pressure and is thereby affected by a local QNH pressure of the current position; and an updated target altitude calculation device that arithmetically calculates a sum of the target security altitude and the correction value to obtain an updated target altitude that replaces the target altitude to be reached before the end of the emergency descent, the updated target altitude being corrected from potential collision risks caused by the potential error between the actual current altitude of the aircraft and the measured barometric altitude, wherein the target updating device transmits the updated target altitude via a link to an automatic control system of the aircraft to automatically conduct the emergency descent using the updated target altitude.

9. An automatic control system for automatically controlling an emergency descent of an aircraft, comprising:

a target updating device for updating a target altitude intended for an emergency descent of an aircraft, the target altitude representing the altitude to be reached by the aircraft at the end of the emergency descent, said target updating device comprising:
- a target security altitude determination device that automatically and repeatedly determines a target security altitude as a function of the emergency descent, from an activation of the emergency descent, and relative to a reference horizontal distance ahead of the aircraft with respect to an initial position of said aircraft at the activation of the emergency descent, said target altitude determination device further comprising:
  - a first element that calculates a remaining horizontal distance, representing a horizontal distance remaining to be covered by the aircraft from a current position until a position located at the reference horizontal distance;
  - a second element that determines a security altitude corresponding to the remaining horizontal distance;
  - a third element that compares the security altitude to a threshold altitude; and
  - a fourth element that selects, as a target security altitude, a highest value between the security altitude and the threshold altitude, the target security altitude being measured in units of measurement chosen from feet or meters;
- a correction value calculation device that calculates a correction value taking into account variations of barometric pressure occurring during the emergency descent, the correction value being measured in the same units of measurement as the target security altitude and the correction value corresponding to a potential error between an actual current altitude of the aircraft and a measured barometric altitude which is based on a standard reference pressure and is thereby affected by a local QNH pressure of the current position; and
- an updated target altitude calculation device that arithmetically calculates a sum of the target security altitude and the correction value to obtain an updated target altitude that replaces the target altitude to be reached before the end of the emergency descent, the updated target altitude being corrected from potential collision risks caused by the potential error between the actual current altitude of the aircraft and the measured barometric altitude, wherein the target updating device transmits the updated target altitude via a link to an automatic control system of the aircraft to automatically conduct the emergency descent using the updated target altitude;

a vertical setpoint determination device that automatically determines a set of vertical setpoints including the updated target altitude representing an altitude to be reached by the aircraft at the end of the emergency descent and determined by the target updating device, the target updating device being included in the vertical setpoint determination device;

and the set of vertical setpoints including a target speed representing a speed that the aircraft should respect during the emergency descent;

a lateral setpoint determination device that automatically determines a set of lateral setpoints, representing a lateral maneuver to be carried out during the emergency descent; and an aircraft guidance system that automatically guides the aircraft so that the aircraft simultaneously respects the set of vertical setpoints and the set of lateral setpoints until reaching the updated target altitude.

10. The target updating device of claim 8, wherein the correction value calculation device calculates the correction value by retrieving from a memory a lowest atmospheric pressure and a highest atmospheric pressure measured in a current day, calculating first and second differences between the standard reference pressure and the lowest atmospheric pressure and the highest atmospheric pressure, respectively, and selecting a highest difference and converting the highest difference in absolute value into a height value representing the correction value.

11. The target updating device of claim 8, wherein the correction value calculation device calculates the correction value by sensing a current barometric altitude of the aircraft, sensing a current height of the aircraft with respect to sea level using measurements other than barometric measurements, and arithmetically subtracting the current height with respect to sea level from the current barometric altitude so as to obtain the correction value.

\* \* \* \* \*